Feb. 16, 1965  W. S. ROUVEROL  3,169,408
NONLUBRICATED FORMED GEARING
Filed Feb. 7, 1963  3 Sheets-Sheet 1
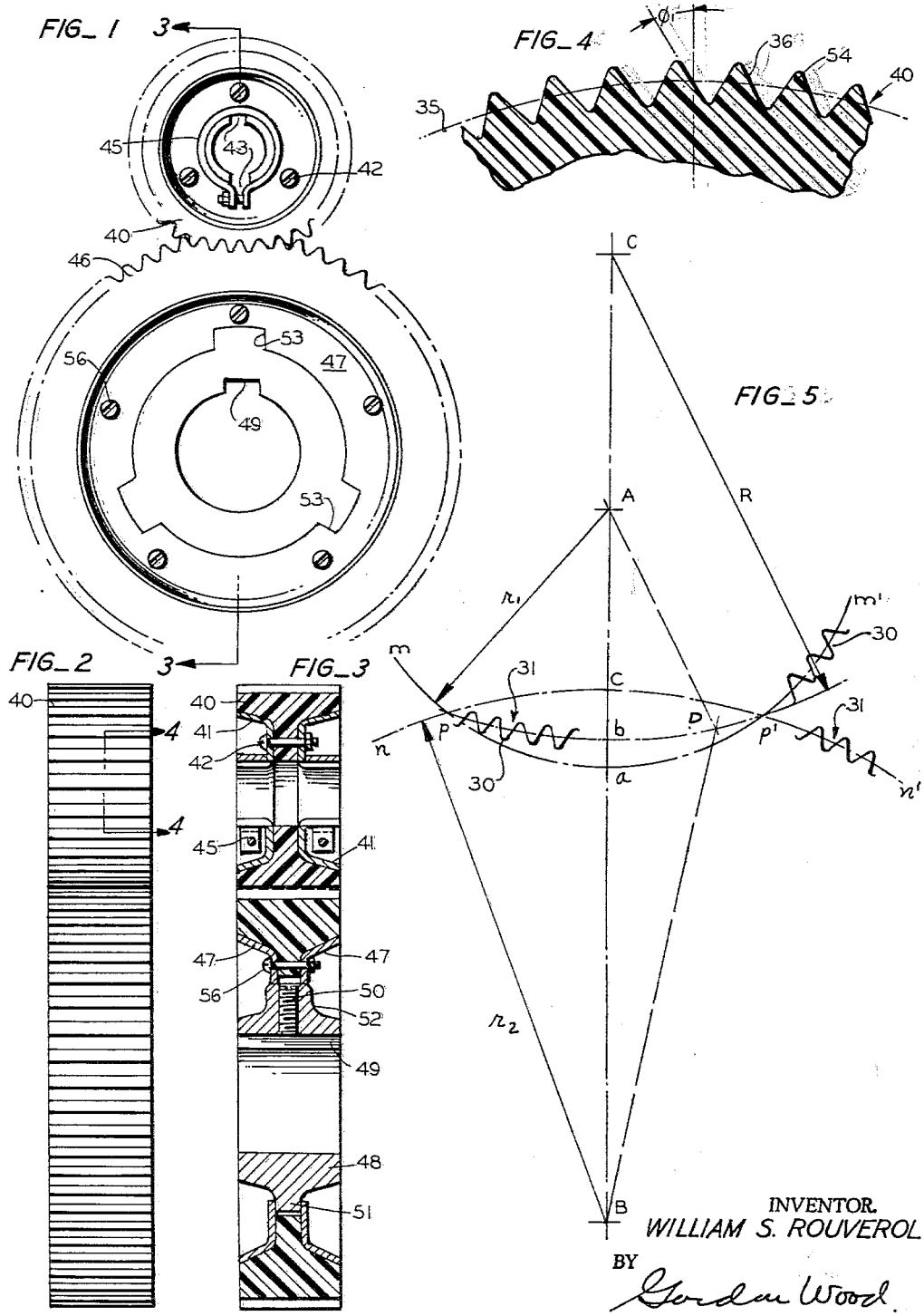
INVENTOR.
WILLIAM S. ROUVEROL
BY
Gordon Wood
ATTORNEY Feb. 16, 1965 W. S. ROUVEROL 3,169,408
NONLUBRICATED FORMED GEARING
Filed Feb. 7, 1963 3 Sheets-Sheet 2
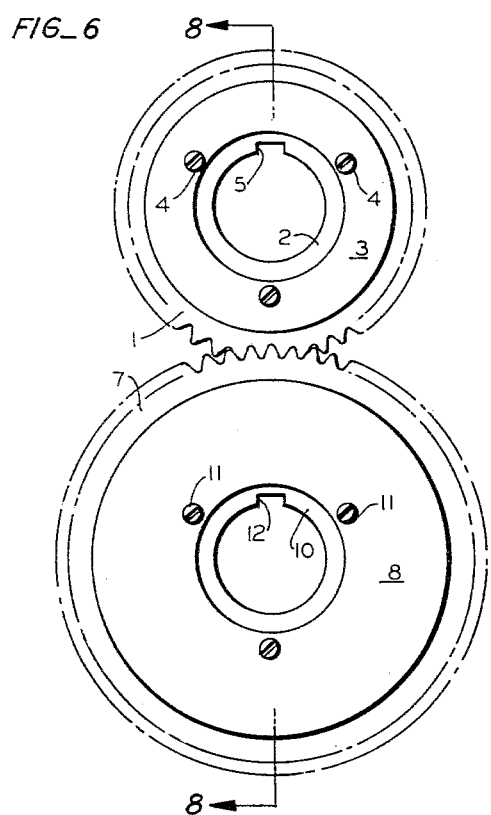
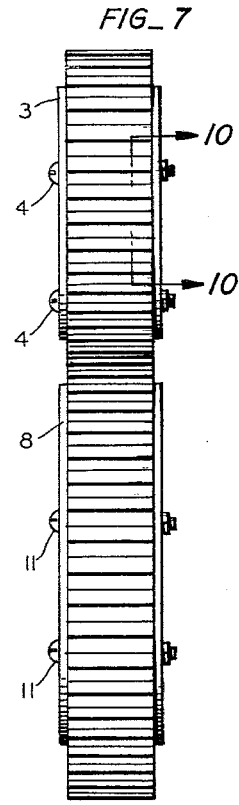
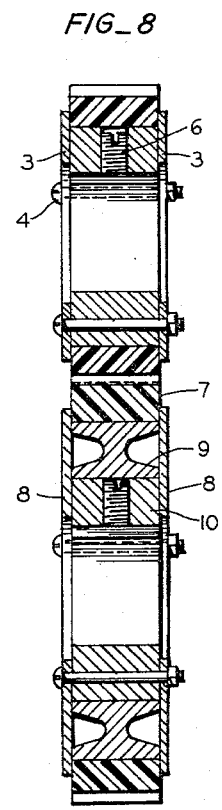
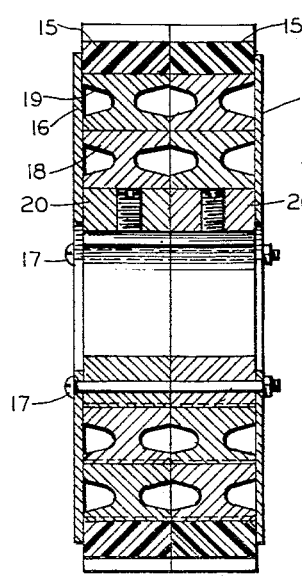
INVENTOR.
WILLIAM S. ROUVEROL
BY
Gordon Wood
ATTORNEY

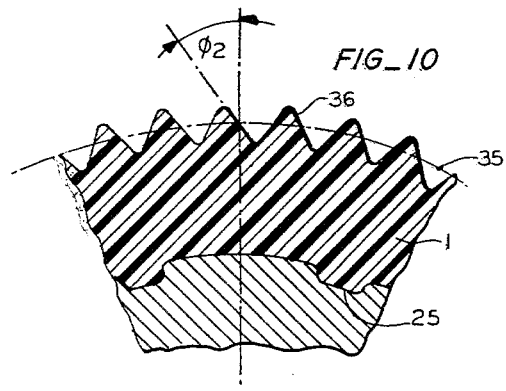
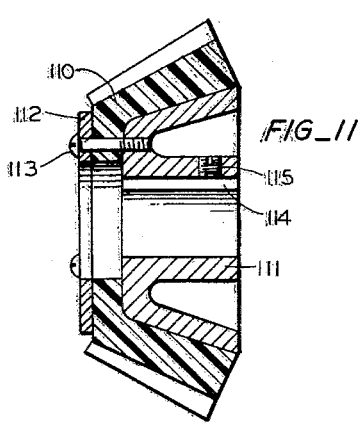
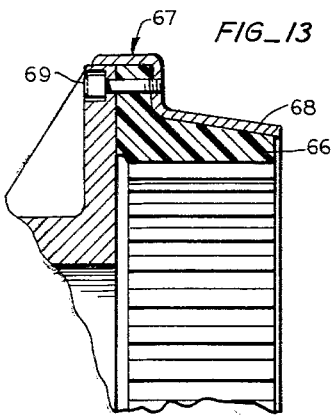
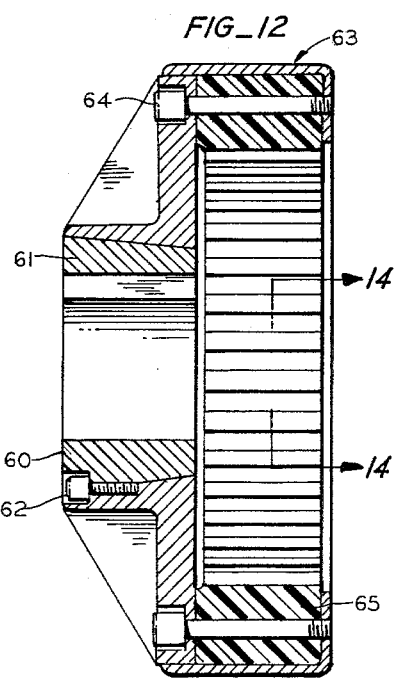
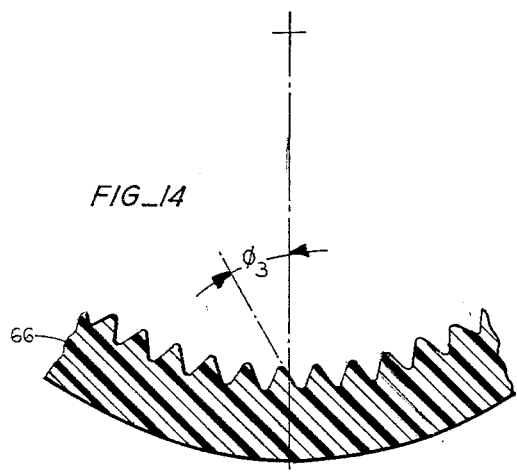
INVENTOR.
WILLIAM S. ROUVEROL
BY
Gordon Wood.
ATTORNEY

2

3,169,408
NONLUBRICATED FORMED GEARING
William S. Rouverol, 1014 Shattuck Ave., Berkeley, Calif.
Filed Feb. 7, 1963, Ser. No. 256,892
4 Claims. (Cl. 74—461)

This invention relates to tooth shapes and body construction for power transmitting gears. Specifically, the invention discloses constructions for the teeth and bodies of mating gears adapted to be manufactured of moldable materials and operated without lubrication.

The high cost of constructing conventional cut gearing transmissions arises from two factors: first, the milling or hobbing of cut gears can only be accomplished by utilizing expensive gear cutting machines for considerable machining-time periods, with correspondingly high amortization costs per set of gears; second, conventional gearing has high-pressure line or point sliding contact between mating teeth, so that lubrication must be provided to prevent wear, and this in turn adds the expense of a housing and oil seals to the high initial cost of the gearing itself.

The present invention discloses constructions which avoid both of these limitations and thereby opens the field of heavy duty power transmission to low cost molded gear sets ideally suited to large quantity production and marketing.

The main object of the invention is thus to provide a type of power transmission gearing which will give good service but which can be manufactured and mounted at a much lower cost than cut gearing.

A further object of the invention is to provide a type of gearing which can be operated without lubrication, but which for a given power capacity is substantially as light in weight and compact as conventional cut steel gearing.

A further object of the invention is to provide a type of gearing which may be made up entirely of interchangeable formed elements standardized to a minimum number of sizes.

Other objects of the invention are to produce a type of gearing which is quieter in operation than even precision cut gearing, especially at high speed; that achieves high efficiency and long wear-life by virtue of the fact that there is no sliding of the contact surfaces; that may be manufactured to more liberal tolerances and aligned less precisely than cut steel gears; that will transmit power at a uniform velocity ratio; and will be extremely simple to assemble and mount.

The means to achieve these and other objects and advantages of the invention will be evident from the drawings as explained in the specification that follows:

FIG. 1 is a side elevation of a pair of mating spur gears embodying the invention.

FIG. 2 is an end elevation of the same.

FIG. 3 is a centerline section of the same.

FIG. 4 is an enlarged fragmentary side elevation of a sector of the small gear of FIG. 1.

FIG. 5 is a geometric construction showing the manner in which the pitch circles of mating gears coalesce to form a common intermediate-radius pitch arc of uniform velocity ratio (zero relative velocity).

FIG. 6 is a side elevation of a pair of mating spur gears showing another embodiment of the invention.

FIG. 7 is an end elevation of the same.

FIG. 8 is a centerline section of the same.

FIG. 9 is a view similar to FIG. 8 but illustrating two gears secured together and showing how wide gears of greater capacity may be built up of the same elements used in narrower gears.

FIG. 10 is an enlarged fragmentary side elevation of a sector of the small gear of FIG. 6.

FIG. 11 is a cross section of a bevel gear embodying the invention.

FIG. 12 is a cross section of an internal gear embodying the invention.

FIG. 13 is a fragmentary section showing a modification of the construction of FIG. 12.

FIG. 14 is an enlarged section of a sector of the internal gear of FIG. 12.

In detail and referring to FIGS. 1, 2 and 3, a set of spur gears is shown in which the small gear includes a toothed rim 40, with a T-shaped section clamped between a pair of dished endplates 41 with a C-shaped section held together with tie bolts 42. The inner portion of the end plates 41 is formed into a hub, with slots 43 provided for one or more keys (not shown). Clamps 45 are provided to tighten the inner diameter of the end plates 41 around a shaft (not shown).

In the larger gear, the toothed rim 46 is also clamped between larger end plates 47 by tie bolts 56, but in this case, a separate hub 48 is provided, with a keyway 49 and setscrew 50. Relative axial movement between hub 48 and endplates 47 is prevented by a ridge 51 on the hub 48 and relative rotational movement is prevented by widened portions 52 of ridge 51 projecting into slots 53 in endplates 47. Tie bolts 42 are located nonsymmetrically with respect to the center of the gears in order to insure that one tooth point or space must be directly above the keyway (43, 49) which in turn insures that two or more gears mounted in tandem on a shaft with a common keyway will mesh properly with mating gears also having a common keyway.

In FIG. 4 a section through rim 40 shows the profile of the teeth 54. The working surfaces are substantially flat and meet almost at a point at the ends and in a V between adjacent teeth, although the tooth ends and the bottom of the V are slightly rounded to reduce stress concentration. In gearing of this type the term "pressure angle" is used for the angle $\phi_1$ between the flat working surface 36 and a radial line through the pitch point (which is the mid-point of the tooth face and also the point through which the pitch circle 35 passes. This pressure angle $\phi_1$ should be in the range of 30° to 45°, and in most cases in the range 35° to 40°. This means that the width of the tooth at its base is at least 15% greater than the radial height so that each tooth is less susceptible of failure by bending than conventional teeth. A section through the rim 46 of the larger gear would show tooth profiles of substantially the same shape and size (same pressure angle and circular pitch), except possibly in some cases where the material of the rim 46 is not the same as that of rim 40.

The geometric construction of FIG. 5 schematically illustrates the principle on which the gearing disclosed in this specification is based. In this drawing the meshing of the teeth 30, 31 of a pair of mating gears is shown. One gear has a pitch circle $m$–$m'$ of radius $r_1$ and center A. The mating gear has a pitch circle $n$–$n'$ of radius $r_2$ and center B. These two gears are mounted so that their center distance AB is less than the sum of the radii $r_1$ and $r_2$ hence, the two pitch circles interfere in the region $p$–$p'$. The amount of interference shown in FIG. 5 is exaggerated for clarity.

If at least one of the gears is made of a soft pliable material such as rubber, its pitch circle will coalesce with the pitch circle of the other gear and its teeth will conform to those of the other gear along the common pitch arc $p$–$p$.' If the gear centered at B is made of a relatively hard material such as hard plastic or metal, while the gear centered at A is made of rubber, the contact arc will be $p$–$c$–$p'$ and will be substantially on the pitch circle $n$–$n'$. Similarly, if the materials of the two gears are the reverse the contact arc will be $p$–$a$–$p'$, which will be substantially on the pitch circle $m-m'$. But if the two gears are made of materials having substantially the same elastic properties, the pitch arc will lie in between the arcs $p-a-p'$ and $p-c-p'$, in some intermediate arc $p-b-p'$, and the teeth 30, 31 will conform in the manner shown in FIG. 5.

The determination of the most desirable proportions for mating gears will depend on whether or not their elastic properties are the same. For example, if gear A is rubber and gear B is metal (or other hard material), it is not always desirable to employ the same tooth pitch and pressure angle on both gears. This will be evident from considering a case in which neither gear possesses teeth, but each is simply a cylindrical roller. In this case it would be found that when the metal roller is turned one full revolution, the rubber roller would turn more or less than $r_2/r_1$ revolutions, depending on whether the contact arc $p-c-p'$ is shorter or longer than the free or unstressed arc distance $p-a-p'$. This in turn will depend on whether the free radius of the rubber roller $r_1$ is greater or less than $r_2$. If the two radii are anything but equal, the metal roller will, in effect, measure out its circumference on momentarily stretched or compressed rubber, and the velocity ratio will not be in proportion to the ratio $r_2/r_1$.

If teeth are now placed on the two rollers, however, positive engagement between them will require the velocity ratio to be in proportion to the number of teeth on each gear. There are then two possibilities. One is to give the teeth on the rubber gear a different pitch and pressure angle than those on the metal gear. In the case of the particular proportions shown in FIG. 5, the arc $p-c-p'$ is shorter than arc $p-a-p'$ ($r_2$ being greater than $r_1$) hence if the member centered at B were a roller, it would measure out its circumference on material momentarily compressed (in the tangential direction) and thereby cause the mating roller at A to rotate faster than $r_2/r_1$ times the velocity of the roller at B. If teeth are then put on these rollers, it may therefore be desirable to put fewer teeth on the rubber roller than $r_2/r_1$ times the number of teeth on the metal gear, and hence the circular pitch and pressure angle of these teeth should be slightly greater than those on the metal gear.

Although dissimilar circular pitches may be used for custom made gear sets, they are not appropriate for any fully interchangeable system, for the reason that the appropriate pitch and pressure angle for any rubber gear will depend on whether the diameter of the particular metal gear with which it is to be mated is larger or smaller than its own diameter.

If on the other hand the pitch and pressure angle are kept the same on both gears, so that the smaller gear 30 is forced to rotate at $r_2/r_1$ times the speed of gear 31, then another difficulty arises; the velocity at the pitch point $c$ is governed by the metal gear and in effect imposed on the rubber gear. But since the distance ratio $Bc/Ac$ is considerably larger than the angular velocity ratio $r_2/r_1$, the point $c$ considered to be in the rubber gear is being urged in the direction of motion much faster than it would otherwise go. Hence, a considerable amount of tangential shear will be set up in the rubber gear, and the capacity of the rubber gear to carry useful torque load will be correspondingly reduced.

Although neither of the above limitations will prevent gears of dissimilar elastic properties from functioning with some degree of effectiveness, an optimum design from the standpoints of both interchangeability and minimum induced stress is one in which the elastic properties of the two gears are the same or nearly the same. Gears (or rollers) will possess the same elastic properties with regard to pressure in the radial direction insofar as this invention is concerned if the deformation of the rims in a radial direction in response to pressure between the two gears is such that the deformations are respectively proportional to the pitch radius or diameter of the gears.

The deformation of each rim in a radial direction bears a direct relationship to the thickness of the rim and an inverse relationship to the modulus of elasticity of the material of the rim. If a pair of mating rims are made of rubber of the same durometer hardness it will be apparent that the deformation under a particular radial loading may be varied by varying the thickness of the rim. It is thus a fairly simple matter to proportion the rim thicknesses for a particular spacing between the gear axes (which determines the loading) so that the two gears mate with their pitch circles coalesced along an arc approximately that shown at $p-b-p'$ in FIG. 5. In such a case the local deformation $b-c$ of the gear at B represents the same proportion of pitch radius $r_2$ as the corresponding deformation $a-b$ does to the pitch circle $r_1$ of the gear at A.

If the gears are made of materials having different moduli of elasticity it will be apparent that the rim thicknesses may be modified to take into consideration the fact that the material of lower modulus of elasticity undergoes more deformation under the same unit loading than the material of higher modulus of elasticity.

It may further be demonstrated that a circle constructed to contain the points $p$, $p'$ and $b$ as defined above will have its center at C and a radius R equal to the reciprocal of the quantity $1/r_1$ minus $1/r_2$, or $$R = \frac{r_1 r_2}{r_2 - r_1}$$

and all points on this circle such as D will be removed from gear centers A and B by distances AD and BD in exact proportion to the pitch circle radii $r_1$ and $r_2$. The arc $p-b-p'$ might therefore be thought of as the particular arc of contact for pliable gears of the same pitch that will minimize nonuseful shear in the teeth and rims. It is also the longest arc of contact that may be obtained for a given maximum radial stress in either of the mating gears. Hence, the maximum torque capacity for a pair of gears of given diameter will generally be obtained by utilizing rims of similar elastic properties as defined above. Whether or not this optimization of torque capacity will be a more important consideration than minimizing the first cost, since a pair comprising one phenolic or die-cast metal and one rubber gear will be the cheapest combination, will depend on the particular application.

Referring to FIGS. 6, 7 and 8, the smaller of the two gears shown is made up of a toothed rim 1 mounted on a hub 2, with the axial motion between these two elements prevented by end plates 3, tied together by means of tie bolts 4 extending through holes in the hub 2. A keyway 5 and set screw 6 are provided to permit fixing hub 2 to a shaft (not shown).

The larger of the two gears is similar in construction, except that the toothed rim 7 may, if desired, be of a different material than its mate 1, the end plates 8 are larger in diameter and a ringshaped spacer 9 is interposed between the rim 7 and the hub 10. Tie bolts 11 and keyway 12 correspond to tie bolts 4 and keyway 5 of gear 1.

FIG. 9 shows how a gear of greater torque capacity can be built up of elements similar to those shown in FIGS. 6, 7 and 8. In this construction two toothed rims 15 are retained between two end plates 16 by means of longer tie bolts 17, with two ring-shaped spacers 18, 19 interposed between each rim 15 and its hub 20.

FIG. 10 shows the "saw tooth" profiles of rim 1 (FIG. 6) and the typical splines 25 that prevent relative rotation between adjacent rims (1, 7, 15), spacers (9, 18, 19) and hubs (2, 10, 20). The pitch circle is 35. The tooth faces 36 should be substantially flat, as in the case of FIG. 4, and should have rounded ends and fillets, and should have a pressure angle $\phi_2$ of 30 to 45°. The characteristic of the tooth profiles of the mating rim 7 should bear the same relation to those of rim 1 as in the corresponding parts of FIG. 4, and, hence, if the elastic moduli of both rims are the same, the circular pitch and pressure angles of both should be the same.

It should be noted that draftsmen sometimes draw gear teeth schematically showing flat sides and sometimes also pointed ends, as on a saw, because the involute curve cannot be drawn with conventional drafting equipment (see for example U.S. Pat. No. 2,720,119). Such schematic showing is clearly not intended to constitute a faithful disclosure of the actual gear construction.

It will also be noted that splines 25 shown in FIG. 10 are also shown in FIGS. 8 and 9, but only on the lower section of the gears. This is because one spline directly above the keyway has been omitted to insure that the teeth of two or more rims 15 (FIG. 9) mounted in tandem will align. To achieve this it is necessary that the rims 15 all be either marked or manufactured so that one tooth root or one tooth point be directly outward radially from the missing spline tooth.

In FIG. 11 showing a bevel gear, a conical toothed rim 110 is held onto a conical hub 111 by means of a single endplate 112 and tie bolts 113. A keyway 114 and setscrew 115 are also provided. Tooth profiles are as shown in FIG. 4 or 10.

In FIG. 12, showing an annular gear, a relatively rigid hub 60, as may be obtained by using a tapered bushing 61 with tightening screws 62, carries an outer shroud 63 with an L-shaped section. Tie bolts 64 threaded onto shroud 63 hold together the hub 60, the shroud 63 and the toothed annulus 65.

FIG. 13 shows an alternative to the construction of FIG. 12. In this case the shroud 67 has a conical portion 68, so that tightening of tie bolts 69 reduces the pitch diameter of pliable ring 66. As is the case with the external gears of FIG. 1, this type of rim deformation permits helical teeth to be used instead of straight (if desired) because tightening will not alter the helix angle. The pressure angle $\phi_3$ (FIG. 14) is as defined before: the angle between tooth flank and a radial plane through the pitch point.

Materials suitable for use in the types of gear rims described above should be reasonably soft or pliable, and should be resilient enough to resist cold flow in the contact zone when the gears are stationary for extended periods. Such materials will be called, for the purposes of this specification "pliable" because they have a low modulus of elasticity and "resilient" because they have a high modulus of resilience (tensile strength squared divided by twice the modulus of elasticity). The fact that such materials are moldable (as well as extrudable) whereas steel is not, is fundamental to their selection for use in the types of gearing contemplated herein. At present the most suitable materials having pliability and resilience are the elastomers.

Pliable resilient teeth of the shapes disclosed herein may be advantageously used in many gears where the quantity to be manufactured justifies the preparation of the molds, in which case suitable gear bodies, integral with the rim or otherwise, may be employed which are not novel. However, the tooth shapes disclosed in the foregoing drawings and specification lend themselves especially to mass production in standard interchangeable sizes, much as V-belts and V-belt pulleys have been standardized. Since gear pitch and face width are not tied together by the problems of shaft alignment as in the case of metal to metal gearing, a single standard pitch such as 20 teeth per inch of diameter may be used, and also a standard face width such as one inch or three-quarters of an inch. Thus all gears will mate with all other gears of the system.

Further, if gear bodies are used that interpose spacers and/or end plates of standard sizes between hubs and rims, the number of parts which distributors must stock is reduced to approximately the same number as in the case of V-belts. If the standard increments are to be in inches, the sizes available would be as follows:

| Part | Available Increments On I.D. | Available Increments On O.D. |
|---|---|---|
| Hub | 1/16" | 1". |
| Spacers and/or end plates | 1" | 1". |
| Rims | 1" | 1/20" (for 20 pitch standard). |

The various permutations and combinations in which gears constructed as shown in FIG. 3 or 8 may be made up out of such standardized elements reveal that a stock of approximately 200 different parts will allow the assembly of more than 2,000,000 different gear sets.

It should be noted that the interference between mating gears, shown as the distance $a$–$b$ in FIG. 5, must be increased according to the maximum amount of torque to be transmitted, the upper limit of interference however depending chiefly on the allowable radial stress that can be accommodated by the rim material. In some installations the desired amount of interference may be obtained by moving the shaft on which is mounted one of the gears closer to the other gear after both gears are assembled onto their respective shafts. In many installations, however, the shafts mounting a pair of mating gears will be journaled into a common housing and hence will not be movable. In such cases it will be desirable to increase the pitch diameter of at least one of the gears (or decrease the pitch diameter if it is an internal gear as shown in FIG. 12 or 13) after it is in position. This may readily be accomplished simply by tightening of the tie-bolts (4, 11, 17, 42, 56, 64, 69, 113) to axially compress the rubber rim. In FIGS. 6, 7, 8 and 9 it is presumed that the free axial width of the rubber rim (1, 7, 15) is slightly greater than that of both the spacers (9, 19) and the hub (2, 10, 20). It may also be noted that in FIGS. 3 and 13 the cone angle of the dished supporting plates must be increased approximately in proportion to the rim pitch diameter, in order that the interference produced by a given amount of axial tightening will be in proportion to rim pitch diameter.

Many of the features disclosed herein may be used separately or combined in obvious ways other than precisely as shown in the drawings. For example, FIGS. 4 and 10 could be considered normal sections of helical teeth as well as straight teeth. Various combinations of similar or dissimilar plastic, rubber-like or metallic material may be used in mating gear rims. The body construction of FIGS. 1 and 13 is applicable to helical or herringbone teeth, if desired. No set screw is required in hub 2 or 10 if the material of the hub is made of any slightly flexible material such as phenolic, which can be made to grip the key and shaft by sufficient tightening of the tie bolts. Also, if it is desired to reduce torsional deformation, especially of large gear rims, the rims may be reinforced with an interior fabric casing in the same fashion as in automobile tires. It should be noted that the wear characteristics of the gears described in this specification may be improved by conventional methods of obtaining high finishes, as by anodizing of aluminum gears, or by chrome or other plating of mold or die surfaces. Also, rubber or neoprene gear rims may be faced with a layer of nylon to improve tooth wear. The "saw tooth" type of profile could also be altered to any other intermeshing variety which are able to conform to mating teeth without binding and engage and disengage without interfering. Tooth faces need not be completely flat, but may be crowned (i.e., made slightly convex) if it is desired to reduce somewhat the pressure on the end portion of the teeth; "pitch diameter" means the diameter of a circle through the mid-points of the tooth faces.

In the claims below, the following terms are intended to have the following meanings: "formable" means adapted to being manufactured by forming against a finished die or mold surface with no separate finishing operation involving scraping, cutting, grinding of material from the tooth surface, as for example, by molding, plastic casting, extruding or die-casting; "in section" referring to gear teeth means a section taken in a plane perpendicularly to the tooth direction; "pliable" means having a modulus of elasticity of less than 500,000 pounds per square inch; "resilient" means having a modulus of resilience of more than 50 pounds per square inch; "complementarily formed" means that the teeth of one gear, in section, have effectively the same shape as the spaces between teeth in the mating gear.

I claim:

1. A pair of mating gears having an area of engagement and having similar complementarily formed tooth profiles and respectively mounted for rotation about spaced apart axes, the spacing between said axes being such as to cause compressive deformation of mating gears at the area of engagement thereof whereby a plurality of teeth of one gear are in mesh with a plurality of teeth of the other gear, the teeth of both of said gears being formed of resilient pliable material to permit such compressive deformation through the teeth of each gear.

2. A pair of mating gears according to claim 1 wherein said gears have different diameters and the deformation of each gear is proportional to its pitch radius.

3. A pair of mating gears according to claim 1 wherein the pitch circles of said gears coalesce at said area with the common pitch arc being substantially the arc of a circle having a radius approximately equal to the quotient of the product and the difference of the radii of said pitch circles.

4. A pair of mating gears according to claim 1 wherein said gears are formed with rims of resilient pliable material in which said teeth are formed, and the radial deformation of each of said rims bears a direct relationship to the thickness of the rim and an inverse relationship to the modulus of elasticity of the material of the rim.

References Cited by the Examiner
UNITED STATES PATENTS

| | | | |
|---|---|---|---|
| 315,214 | 4/85 | Allen | 74—443 |
| 584,521 | 6/97 | Rich | 74—206 |
| 680,891 | 8/01 | Smith | 74—215 X |
| 820,789 | 5/06 | Hutchins | 74—443 |
| 1,235,734 | 8/17 | Stange | 74—443 |
| 1,297,835 | 3/19 | Guay | 74—461 |
| 2,017,139 | 10/35 | Wood | 74—216 |
| 2,313,445 | 3/43 | Lamb | 74—461 |
| 2,530,767 | 11/50 | Hamill | 74—461 |
| 2,594,207 | 4/52 | Pierce | 74—461 |
| 2,932,992 | 4/60 | Larsh | 74—461 |

DON A. WAITE, *Primary Examiner.*

BROUGHTON G. DURHAM, *Examiner.*